Oct. 6, 1959
E. M. HUDSON ET AL
2,907,869
INSTRUMENT ILLUMINATOR
Filed Aug. 14, 1957
2 Sheets-Sheet 1
FIG. 1
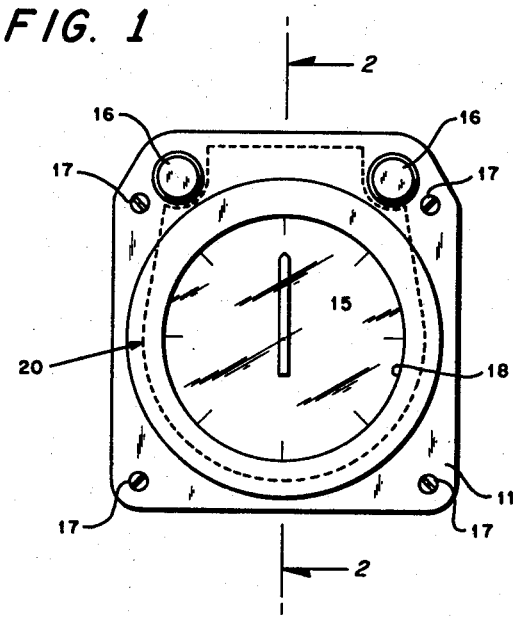
FIG. 2
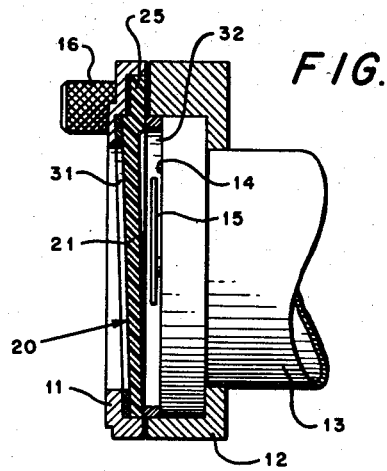
FIG. 3
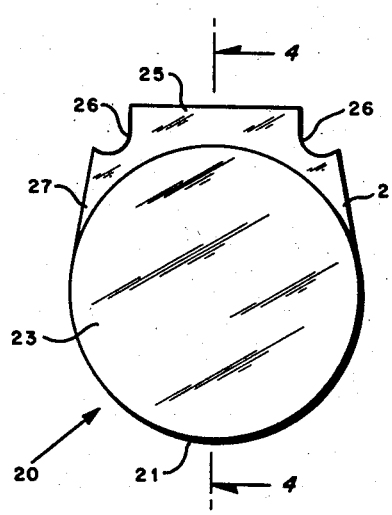
FIG. 4
FIG. 5
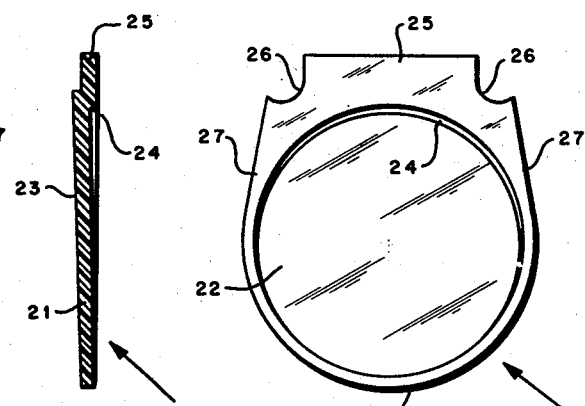
FIG. 6
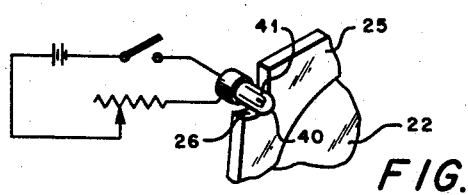
INVENTORS
EDWIN M. HUDSON
JOSEPH VACCARO, JR.
BY
ATTORNEYS Oct. 6, 1959                E. M. HUDSON ET AL                2,907,869
                              INSTRUMENT ILLUMINATOR
Filed Aug. 14, 1957                                          2 Sheets-Sheet 2
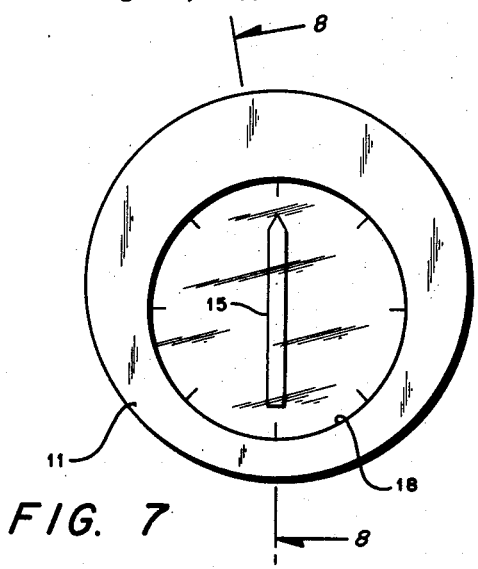
FIG. 7
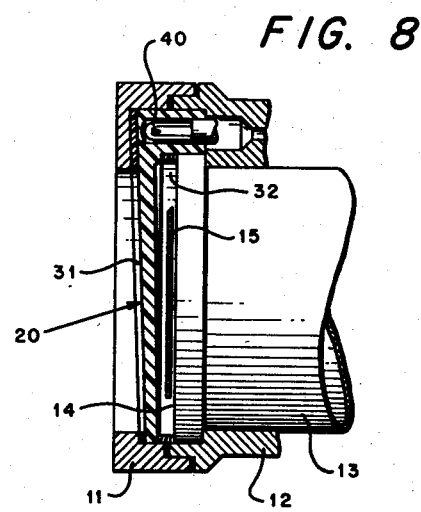
FIG. 8
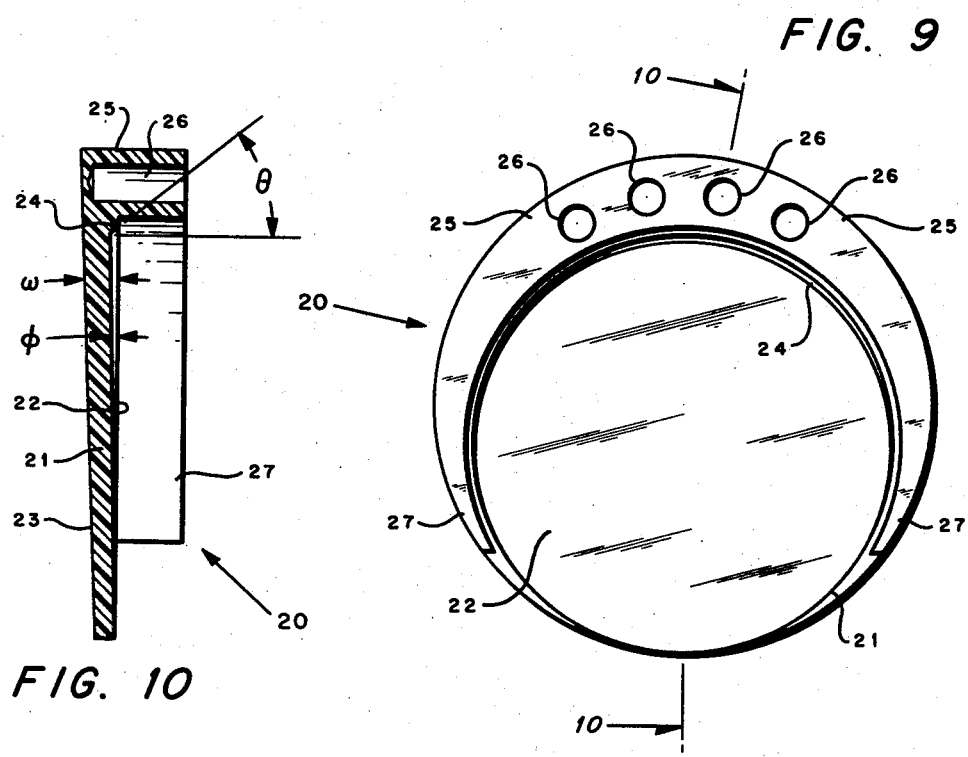
FIG. 9
FIG. 10
INVENTORS
EDWIN M. HUDSON
JOSEPH VACCARO, JR.
BY
ATTORNEYS

United States Patent Office 2,907,869
Patented Oct. 6, 1959

2,907,869
INSTRUMENT ILLUMINATOR

Edwin M. Hudson, New Hope, and Joseph Vaccaro, Jr., Springfield, Pa., assignors to the United States of America as represented by the Secretary of the Navy Application August 14, 1957, Serial No. 678,256

3 Claims. (Cl. 240—2.1)

(Granted under Title 35, U.S. Code (1952), sec. 266)

The invention described herein may be manufactured and used by or for the Government of the United States of America for governmental purposes without the payment of any royalties thereon or therefor.

The instant invention relates to means for illuminating instrument faces, and more particularly to means for illuminating instrument faces mounted integrally of an instrument assembly for providing controlled illumination uniformly distributed at various intensity levels over the entire surface of both individual and multiple dial instrument faces.

While there are numerous known means for illuminating the display area of instrument faces either directly or indirectly, these various known means are generally characterized by a level of illumination inadequate for certain purposes or by an undesirable variation in the level of illumination over the face of the instrument, or by both of these deficiencies. Known means for indirectly illuminating instrument faces include a transparent wedge shaped element or prism peripherally shaped to be superimposed over the face of an instrument to direct light emanating from a source adjacent the widest portion of the wedge or prism onto the instrument face. Such a device offers numerous advantages over previously known devices, including a configuration which is light in weight, simple of construction and inexpensive to make, universally adaptable to a wide variety of instrument faces, and arranged to eliminate specular reflections and shadows. In fact, such a device may so effectively distribute light to the narrowest portion of the wedge from light sources adjoining the widest portion of the wedge that the relatively low level of light intensity normally characterizing an area relatively remote from a light source is by this means replaced by a relatively high level of light intensity on the edge of an instrument face most remote from the light sources, a phenomenon which is not objectionable under favorable conditions, but which tends to limit visual interpretation of an entire instrument face under particularly adverse viewing conditions, where readability is marginal at best.

In contrast to the teachings of the prior art, the instant invention contemplates the use of an improved indirect lighting means for instrument faces including a transparent wedge shaped prism portion formed integrally with a transparent light guide portion arranged to be illuminated by a plurality of light sources so that these components together assure both a satisfactory level of intensity in excess of minimum requirements therefor and an even distribution of light intensity over the entire face of an instrument associated therewith, even when at least one of a plurality of light sources is rendered inoperative.

An object of the instant invention is the provision of a means for indirect illumination of instrument faces which provides a uniform distribution of light intensity over the entire display area.

Another object of this invention is to provide an illuminating means for instrument faces which provides substantial latitude of control of light intensity over the entire surface of an instrument face over a range extending upwardly from minimum requirements for illumination.

Yet another object is the provision of an illumination device for instrument faces which is light in weight, compact, embodies a minimum of parts, and is simple to fabricate.

Still another object of this invention is to provide an illumination device for instrument faces arranged to be mounted externally of an instrument without modification of an instrument assembly and universally adaptable to various types and sizes of instruments.

A further object is the provision of an indirect illumination means for instrument faces including a wedge shaped transparent element integral with a light guide arranged to effectively direct light from sources thereof through the wedge shaped element to the display area encompassed by an instrument face.

A final object is to provide an illumination device for instrument faces including a wedge shaped transparent element in cooperation with an adjoining lip having a tapered surface thru which light is admitted to the face of an instrument.

Other objects and many of the attendant advantages of this invention will be readily appreciated as the same becomes better understood by reference to the following detailed description when considered in connection with the accompanying drawings wherein:

Fig. 1 is a front elevation of a typical aircraft instrument assembly upon which a preferred embodiment of the illuminating means comprising the instant invention has been incorporated, Fig. 2 is a vertical section taken on line 2—2 of Fig. 1 showing the operative relationship between the preferred embodiment of the instant invention and a typical instrument assembly, Fig. 3 is a front elevation of the preferred embodiment of the instant invention, Fig. 4 is a vertical section taken on line 4—4 of Fig. 3, Fig. 5 is a rear elevation of the embodiment of the instant invention illustrated in Figs. 3 and 4, Fig. 6 is an isometric view, partially broken away, of the preferred embodiment of the instant invention disposed in operative relationship to a typical light source therefor, Fig. 7 is a front elevation of an instrument assembly fitted with an alternative embodiment of the instant invention, Fig. 8 is a vertical section taken on line 8—8 of Fig. 7 showing the operative relationship between the alternative embodiment of the instant invention and an associated instrument assembly, Fig. 9 is a rear elevation of the alternative embodiment of the instant invention, and Fig. 10 is a vertical section taken on line 10—10 of Fig. 9.

Referring now to the drawings wherein like reference numerals refer to like or corresponding parts throughout the several views, the showing in Fig. 1 includes a conventional frame or cover 11 for a typical instrument assembly provided with attachment means such as screws 17 for securing the cover 11 to supporting means for the instrument assembly. In addition, Fig. 1 shows the calibrated face 14 of an instrument exposed through a central opening 18 in the cover 11, at least one pointer or indicator element 15 disposed in operative relationship to the calibrated instrument face 14, caps 16, attached to the cover 11 as by threadable engagement with suitable threaded cylindrical bosses and arranged to enclose and support sources of illumination such as incandescent bulbs not shown in Fig. 1 or Fig. 2, and, finally, Fig. 1 includes a dotted outline of transparent element 20 comprising indirect illuminating means for an instrument assembly superimposed over the instrument face 14 and beneath the cover 11.

Referring next to Fig. 2, the indirect lighting element 20 of transparent material is shown disposed in operative relationship to the instrument face 14 and the pointer or indicator means 15 associated therewith. From consideration of the showing in Fig. 2 it will become apparent that the frame or cover 11 cooperates with a supporting means 12 for the instrument assembly 13, which may be connected to or formed integrally with an instrument panel as in an aircraft, to support the indirect lighting element 20 including the prismatic transparent wedge portion 21 and the integrally formed light guide portion 25 thereof in its proper position in relation to the instrument face 14. In view of the substantial heat generated by the incandescent light sources within the caps 16 the various elements disclosed in Fig. 2 are subjected to substantial localized expansion and contraction with temperature changes. Therefore, in order to avoid cracking or fracturing the indirect lighting element 20 conveniently formed of transparent plastic material, glass, or the like, the element 20 is supported between the cover 11 and the supporting means 12 by suitable resilient gasket means including a first annular gasket 31 disposed between the cover 11 and the element 20, and a second annular gasket 32 disposed between the element 20 and the instrument face 14 or the instrument assembly 13 of which the instrument face 14 is a part. The actual thickness of the annular gasket 32 must be adjusted to provide the proper clearance between the instrument face 14 and the element 20 for each instrument assembly, taking into account the thickness of the indicator element 15 and its spacing from the face 14, the amount of offset of various surface levels and cooperating indicator elements in multiple dial instruments, or the contours of a display area which is not made up of generally planar elements as in the case of gyro-horizons including spherical elements. However, the element 20 should be positioned as close as possible to the surface of the instrument face 14 for the most effective performance of the instant invention. Hence, for practical purposes, the thickness of the spacing means including the gasket 32 is generally between one sixty-fourth and one quarter of an inch, depending upon the configuration of the instrument face to be illuminated. Where the thickness of the requisite spacing means for a particular configuration of an instrument assembly exceeds a practical thickness for the gasket 32, a supplemental annular spacing element of metallic or other rigid material may be used as a shimming means in combination with gasket 32.

Since the instant invention is suitable for use in illuminating display areas of various configurations, a simplified representation of the instrument face 14 and the indicator element 15 has been shown in Figs. 1 and 2 and in Figs. 7 and 8, although it is to be understood that the display area may comprise several planar or non-planar surfaces and include a plurality of indicating means of various configurations.

Figs. 3, 4 and 5 together show various detail features of the preferred embodiment of the indirect lighting element 20 comprising the preferred embodiment of the instant invention. The unitary indirect lighting element generally designated by reference numeral 20, fabricated from a rigid transparent material such as a plastic, which may be molded in the proper shape when produced in quantities, glass, or the like, includes the generally circular wedge shaped prismatic portion 21 having a rear face 22 angularly offset by a small amount from an instrument face 14, shown best in Fig. 2, and a front face 23 angularly offset by a small amount from the rear face 22 of the portion 21 of element 20, the light distribution over an instrument face provided by the wedge shaped portion 21 is augmented adjacent the widest portion of the wedge by a beveled lip or projection 24 comprising a sloping surface disposed at an obtuse angle to the face 22 and projecting outwardly therefrom along the circular periphery of face 22 as seen best in Figs. 4 and 5. The unitary element 20 also includes the integral light guide portion 25 extending across the thickest portion of wedge shaped portion 21 and for a substantial distance along the peripheral edge of portion 21. The light guide portion 25, as illustrated in Figs. 3, 4 and 5 is arranged to cooperate with a spaced pair of light sources arranged in a manner well known in the art within the pair of externally disposed caps 16 illustrated in Figs. 1 and 2. The light transmitting surfaces 26 of the light guide portion 25 are designed for the maximum practical admission of light to the light guide from concentrated sources approximating point sources, such as the very small incandescent bulbs well known in this art, disposed in relation to the light guard in the manner indicated in the isometric detail view of Fig. 6. With this arrangement, the filament sources of light are positioned so that the surfaces 26 of the light guided portion 25, are disposed radially relative to the respective light sources and so that the filament 41 of each light bulb 40 is disposed substantially in the plane of the rear face 22 of the portion 21 of element 20. However, in particular installations where specialized lighting problems are encountered, as in the case of instrument faces 14 with multiple dials and a plurality of pointers 15, offset by small amounts, a modified arrangement of the light bulbs 40 may be necessary to modify the light distribution over the instrument face to a small extent, such modification being achieved by offsetting the filament 41 of the lamp 40 a small amount from the plane of the inner face 22 in the direction of the instrument face 14. Since a very high percentage of the total illumination available from the sources thereof provided is usefully employed in the instant invention due to the particular configuration of the integral light guide portion 25, control of the intensity of the illumination on the instrument face over a relatively wide range is permissible with the instant invention without reducing the illumination below the minimum acceptable value therefor. In addition, the high degree of efficiency with which light is distributed by the light guide portion 25 of the instant invention from either of the pair of light sources assures a satisfactory light distribution over the face of an instrument, even when one source of illumination has failed.

The effectiveness of the light transmitting surfaces 26 of the light guide portion 25 will be substantially enhanced by making these surfaces relatively smooth, as by polishing them, but it is particularly important that the entire peripheral surface of the element 20 other than the light transmitting surfaces 26 be highly polished or otherwise made very smooth to maximize their reflective characteristics and thus minimize light transmission therethrough, in order to minimize light losses and thereby assure a high level of illumination over the entire display area illuminated by means of the instant invention.

In all embodiments of the instant invention, sufficient clearance may be provided between the bulbs 40 and the respective radially curved surfaces 26 to accommodate conventional cylindrical light filters disposed concentrically of the bulbs 40.

Operation of the instant invention, using the embodiment illustrated in Figs. 1 thru 6, is effected by installing the indirect lighting element 20 over an instrument face 14 and properly positioning the element 20 with respect to the instrument face 14 by means of a suitable annular washer 32 such as rubber or other resilient material or the like, said washer being selected to be the proper cross sectional dimensions to clear the sloped surface of lip 24 and space the element 20 at the proper distance from the instrument face 14 to clear the indicator 15. The element 20 is in turn enclosed and supported by the frame or cover 11 acting thru the second resilient gasket 31 of rubber or other resilient material or the like and secured by suitable fastening means such as screws 17 extending thru the cover 11 into a supporting member 12. With suitable bulb assemblies 40 secured within the caps 16 and connected to a suitable power source a larger percentage of the light emanating from the respective bulbs is transmitted thru the respective light transmitting surfaces 26 to the interior of the light guide 25 at such angles that the light is reflected back from the exterior surfaces of light guide 25, including the downwardly depending portions 27, until the light is distributed throughout the element 20, including the wedge shaped prismatic portion 21. The light so distributed by means of the light guide is directed into the wedge shaped prismatic portion 21 of element 20 and thence thru the inner face 22 thereof to illuminate the instrument face 14. Since it is characteristic of such wedge shaped prismatic forms to concentrate the greatest light intensity adjacent the thinnest edge thereof, this variation in light distribution is offset in the instant invention by the light emitted from the element 20 thru the sloping surface of the lip 24 thereof to fall directly on the upper portion of the instrument face 14, an arrangement which effectively equalizes the light distribution over the entire face 14 regardless of the level of intensity of the light so distributed.

Figs. 7 and 8 illustrate an instrument installation including an alternative embodiment of the instant invention, shown best in Figs. 9 and 10, which may be used when provision for external access to the illuminating sources such as bulbs 40 is not required. This alternative embodiment is particularly well suited to instrument assemblies arranged to be mounted upon an instrument panel by insertion in the central opening of a clamp type mounting means secured to the panel. In this embodiment of the instant invention the frame or cover 11 is fully enclosed aside from the circular central opening 18 thru which the instrument face 14 and the indicator element 15 may be viewed. The cover 11 is secured to a supporting means 12 in turn secured to a suitable frame such as an instrument panel and arranged to support an instrument assembly 13. While the means for securing the cover 11 to the supporting means 12 is not illustrated, it should be understood that any suitable means such as screws 17 illustrated in Fig. 1, suitable detents or retaining means, or a press fit between the respective members may be relied upon for such connection. Moreover, the supporting member 12 may in fact be formed integrally with and form the casing of the instrument assembly 13. Otherwise, the relative relationship between various elements as illustrated in Fig. 8 for this embodiment corresponds closely to that of the corresponding elements of the embodiment illustrated in Fig. 2. Briefly, the indirect illuminating means comprising the element 20 formed of rigid transparent material such as a suitable plastic, glass or the like, is disposed between and maintained in the proper position by the cooperating action of the cover 11 and the supporting means 12 and protected against the direct impositions of concentrated forces thereon by the inclusion of protective annular gaskets 31 and 32 of suitable resilient material disposed between the element 20 and cover plate 11, and between the element 20 and instrument assembly 13, respectively.

Referring next to Figs. 9 and 10 for a showing of the detail features of this embodiment of the element 20, it will be noted that the wedge shaped prismatic portion 21 thereof closely resembles and in fact is equivalent to the corresponding portion of the embodiment illustrated in Figs. 3, 4 and 5 with the inner face 22 thereof offset by a small angle $\phi$ measured from a plane parallel to the instrument face 14 and the outer face 23 thereof offset therefrom by a small additional angular amount, the angle $\omega$ measured from a plane parallel to the instrument face 14, as in the embodiment illustrated in Figs. 3 thru 5, the sloped surface of the lip 24 extending around the circular periphery of the inner face 22 is sloped outwardly therefrom at an obtuse angle therewith, measured by the angle $\theta$ from a reference perpendicular to instrument face 14. In contrast to the embodiment of the instant invention applicable to the conventional instrument assembly illustrated in Figs. 1 and 2, the alternative embodiment illustrated in detail in Figs. 9 and 10 includes an enlarged crescent-shaped integral light guide portion 25 including substantially enlarged downwardly extending terminal portions 27 and provided with recesses to accommodate a plurality of light sources, the number of which may be varied as necessary to provide adequate illumination for instrument faces of various sizes and shapes. In this embodiment as compared to that illustrated in Figs. 3, 4 and 5 the light transmitting surfaces 26 of the light guide portion 25, preferably disposed radially relative to a concentrated light source as noted in describing the preferred embodiment, comprise full cylindrical surfaces defining recesses in which light sources such as bulbs 40 may be positioned concentrically with their filaments 41 substantially in the plane of the inner surface 22 of the wedge shaped prismatic portion 21 of element 20.

In many applications of the instant invention using either the embodiment thereof illustrated in Figs. 9 and 10 or that illustrated in Figs. 3 through 6, the angular offset of the inner face 22 designated in Fig. 10 as $\phi$ may be substantially 1° and the angular offset of the outer face 23 designated in Fig. 10 as $\omega$ may be substantially 3°. The angular disposition of the sloping surface of the lip 24 proves to be a critical factor in controlling the light distribution over the display area. For example for uniform light distribution over an entire display area composed of one or more generally planar elements, the angle $\theta$ measured from a reference normal to the plane of instrument face 14 must be not more than 38°. For other surface configurations of the display area, the angle $\theta$ may be varied as necessary to achieve the light distribution most suitable for the surface configuration involved.

In operation, the embodiment illustrated in Figs. 7 through 10 functions in a manner corresponding to the mode of operation of the embodiment illustrated in Figs. 1 through 6 and described above, with certain additional advantages characteristic of this configuration of the invention. First, by the elimination of externally available access to the illuminating sources, which is provided in the embodiment illustrated in Figs. 1 through 6, this embodiment is rendered substantially more compact and less cluttered, thereby enhancing its suitability for incorporation in an instrument panel including a multiplicity of instrument assemblies and more particularly instrument panels provided with the clamp type supports for instruments. Second, the elimination of provision for access to the illuminating sources is not a critical adverse factor in the sustained utilization of an instrument assembly lighted by means of this embodiment of the instant invention, because the distribution of illumination over the face of an instrument as provided by this embodiment of the instant invention remains satisfactory even after one or more sources of illumination have been extinguished as by failure of one or more bulbs. Hence, the sole significant effect of such a failure is to reduce the range of control for light intensity levels as a result of such failure. However, by suitable design of such an installation the controlled level of intensity may be set initially at a sufficiently high level to avoid falling below an acceptable level as a result of a bulb failure.

In certain applications of the instant invention wherein it is necessary to view an instrument panel from a point at a relatively wide angle in relation to the faces of certain instruments as well as from a point substantially normal to the centers of the faces of other instruments as in aircraft cockpits wherein a co-pilot is positioned at a relatively wide angle relative to instruments positioned in front of the pilot, and vice versa, the emission of light from the peripheral outer edge of the element 20 through the front face 23 of element 20 within the edge of the opening 18 at an acute angle relative to the surface of the instrument panel, resulting in the impingement of prohibitive quantities of stray light on the viewing field of either viewer, creates a situation which badly impairs a viewer's ability to read instruments on his own portion of the instrument panel. This difficulty can be largely obviated by locating the outer edge of the element 20 more remotely from the edge of the opening 18 to greatly reduce the angle relative to the face of an instrument panel at which light reflected from the outer periphery of the element 20 is visible to a viewer. Where restricted space precludes elimination of this problem using the embodiment illustrated in Figs. 1 through 5, this objective can be achieved by resorting to another embodiment of the instant invention resembling that illustrated in Figs. 1 through 6 but different to the extent that the indirect lighting element 20 and the cover or frame 11 therefor are combined in a single transparent unitary structure so that the highly reflective outer periphery of the element 20 is coincident with and identical to the outer preiphery of the cover 11, as illustrated in Fig. 1. In this embodiment of the instant invention it is of course necessary to obscure the entire outer surface of the unitary structure substituted for element 20 and cover 11 by a suitable opaque surface coating except for the area immediately over the instrument face 14, which must remain transparent. Such an opaque surface can be provided, for example, by the application of a highly reflective metallic surface over the entire area which may be protected by painting or otherwise coating such metallic surface.

While the illustrated embodiments of the instant invention are shown applied to circular instrument faces since this shape is the most commonly used in designing instrument faces, it should be understood that the teachings of the instant invention are equally applicable to other instrument faces such as elliptical, square, rectangular, or other shapes by suitable modification of the peripheral shape of the indirect lighting element.

Thus, the instant invention provides a compact, light weight, indirect integral illuminating means suitable for superposition over a display area to be lighted thereby, characterized by a minimum number of parts as well as by relatively high efficiency with respect to the level of illumination achieved in relation to the capacity of the light sources provided and with respect to the uniformity of light distribution over a surface to be lighted, even in thet event of failure of one of the plurality of light sources associated therewith.

Obviously many modifications and variations of the present invention are possible in the light of the above teachings. It is therefore to be understood that within the scope of the appended claims the invention may be practiced otherwise than as specifically described.

What is claimed is:
1. A means for illuminating a display area having a generally planar periphery, comprising a unitary generally planar element composed of rigid transparent material and including a wedge shaped prismatic portion having a periphery coextensive with that of the display area superimposed upon the display area to be lighted in spaced relation thereto, said wedge shaped portion including a first substantially planar face nearest the display area angularly offset by a small amount from the periphery of the display area, a second substantially planar face most remote from the display area angularly offset by a relatively larger amount from the periphery of the display area, and an elongated lip consisting of an outwardly sloping surface projecting toward the display area from the periphery of said first face at an obtuse angle therewith and having a planar outer edge parallel to the periphery of the display area.

2. A means for illuminating a display area having a generally planar periphery, comprising a unitary generally planar element composed of rigid transparent material and including a light guide portion and a wedge shaped prismatic portion, the thickest edge of which is formed integrally with said light guide portion and having a periphery coextensive with that of the display area superimposed upon the display area to be lighted in spaced relation thereto, said wedge shaped portion including a first substantially planar face nearest the display area angularly offset by a small amount from the periphery of the display area, a second substantially planar face most remote from the display area angularly offset by a relatively larger amount from the periphery of the display area, and an elongated lip consisting of an outwardly sloping surface projecting toward the display area from the periphery of said first face at an obtuse angle therewith and having a planar outer edge parallel to the periphery of the display area.

3. A means for illuminating a display area having a generally planar periphery, comprising a unitary generally planar element composed of rigid transparent material and including a first wedge shaped prismatic portion having a periphery coextensive with that of the display area superimposed upon the display area to be lighted in spaced relation thereto; said first portion including a first substantially planar face nearest the display area angularly offset by a small amount from the periphery of the display area, a second substantially planar face farthest from the display area angularly offset by a relatively larger amount from the periphery of the display area, and an elongated lip consisting of an outwardly sloped surface projecting toward the display area from the periphery of said first face at an obtuse angle therewith and having a planar outer edge parallel to the periphery of the display area; and a second light guide portion formed integrally with the thickest edge of said first portion; said second portion including opposed extensions thereof formed integrally with and extending along a substantial portion of the periphery of said first portion and a plurality of light transmitting surfaces arcuately curved in the plane of said unitary generally planar element and disposed concentrically of a corresponding plurality of concentrated light sources.

References Cited in the file of this patent
UNITED STATES PATENTS

| | | |
|---|---|---|
| 2,640,144 | Levy | May 26, 1953 |
| 2,745,946 | Protzmann | Mar. 15, 1956 |
| 2,761,056 | Lazo | Aug. 28, 1956 |

FOREIGN PATENTS

| | | |
|---|---|---|
| 905,448 | Germany | Mar. 1, 1954 |